United States Patent [19]
Cornet et al.

[11] Patent Number: 6,034,145
[45] Date of Patent: Mar. 7, 2000

[54] PROCESS FOR RIGID POLYURETHANE FOAMS

[75] Inventors: Philip Cornet, Overijse, Belgium; Rik De Vos, Varese; Maria Vittoria Franco, Angera, both of Italy

[73] Assignee: Imperial Chemical Industries PLC, London, United Kingdom

[21] Appl. No.: 09/040,077

[22] Filed: Mar. 17, 1998

[30] Foreign Application Priority Data

Feb. 20, 1997 [EP] European Pat. Off. .............. 97104773

[51] Int. Cl.[7] ..................................................... C08G 18/14
[52] U.S. Cl. ......................... 521/116; 521/130; 521/131; 521/137; 521/172; 521/173; 521/174
[58] Field of Search ..................... 521/116, 130, 521/131, 155, 172, 174, 137, 173

[56] References Cited

U.S. PATENT DOCUMENTS

| | | |
|---|---|---|
| 5,028,636 | 7/1991 | Gebauer et al. . |
| 5,424,386 | 6/1995 | Gebauer et al. . |
| 5,451,615 | 9/1995 | Birch . |
| 5,464,562 | 11/1995 | Patterson . |
| 5,684,092 | 11/1997 | Seifert et al. ........................... 521/116 |

*Primary Examiner*—John M. Cooney, Jr.
*Attorney, Agent, or Firm*—Pillsbury Madison & Sutro Intellectual Property Group

[57] ABSTRACT

Use of a mixture of at least two different polyoxyethylene polyether monols to solubilise hydrocarbon blowing agents in polyol compositions for rigid polyurethane foams.

17 Claims, No Drawings

PROCESS FOR RIGID POLYURETHANE FOAMS

This invention relates to processes for the preparation of rigid polyurethane or urethane-modified polyisocyanurate foams, to foams prepared thereby, and to novel compositions useful in the process.

Rigid polyurethane and urethane-modified polyisocyanurate foams are in general prepared by reacting the appropriate polyisocyanate and isocyanate-reactive compound (usually a polyol) in the presence of a blowing agent. One use of such foams is as a thermal insulation medium as for example in the construction of refrigerated storage devices. The thermal insulating properties of rigid foams are dependent upon a number of factors including, for closed cell rigid foams, the cell size and the thermal conductivity of the contents of the cells.

A class of materials which has been widely used as blowing agent in the production of polyurethane and urethane-modified polyisocyanurate foams are the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. Recent concern over the potential of chlorofluorocarbons to cause depletion of ozone in the atmosphere has led to an urgent need to develop reaction systems in which chlorofluorocarbon blowing agents are replaced by alternative materials which are environmentally acceptable and which also produce foams having the necessary properties for the many applications in which they are used.

Such alternative blowing agents proposed in the prior art include hydrochlorofluorocarbons, hydrofluorocarbons and especially hydrocarbons namely alkanes and cycloalkanes such as n-pentane, isopentane, cyclopentane and mixtures thereof.

A disadvantage of these hydrocarbon blowing agents is their limited solubility in the polyol composition.

U.S. Pat. No. 5,464,562 describes the use of a polyoxyalkylene polyether monol initiated with a $C_4$–$C_{24}$ fatty hydrocarbon having one alkylene oxide active hydrogen atom to emulsify $C_4$–$C_7$ (cyclo)aliphatic hydrocarbon blowing agents in polyester polyol compositions. The polyoxyalkylene polyether monol is preferably initiated with a $C_{12}$–$C_{15}$ monol using 6–15 moles of alkylene oxides, preferably mixtures of ethylene oxide and 1,2-propylene oxide. The hydroxyl value of the polyoxyalkylene polyether monols described in U.S. Pat. No. 5,464,562 is below 130 mg KOH/g. Nothing is mentioned about the effect in polyether polyol systems.

WO 96/12759 describes the use of a compatibilising agent to enhance the miscibility of hydrocarbon blowing agents, said agent containing a compatibilising radical of the formula —$(C_nH_{2n+1})$ wherein n is a number greater than or equal to 5, and wherein said agent contains at least one active hydrogen atom, provided that there if no more than one aromatic group per molecule, and further wherein said agent is a fat, oil, monoglyceride, diglyceride, fatty acid, fatty alcohol, fatty amide, fatty amine, fatty acid ester, alkoxylated adduct of any of the foregoing, alkyl phenol or propoxylated adduct thereof, alkyl phenol or adduct thereof with ethylene oxide and propylene oxide, alkyl phenol or adduct thereof with less than an average of four molecules of ethylene oxide per molecule of alkyl phenol or a mixture thereof. A preferred compatibilising agent, described in WO 96/12759, is castor oil. Also the use of 10 pbw of $C_{12}H_{25}$— $(OCH_2CH_2)_4$—OH to dissolve 20 pbw of cyclopentane in 90 pbw of a sucrose/glycerine oxypropylene polyether polyol of OH number 490 is described in WO 96/12759. The amount of the compatibilising agent is 5 to 25 pbw per 100 pbw of polyol and compatibising agent.

It is an object of the present invention to improve the solubility of hydrocarbon blowing agents in polyol compositions, particularly polyether polyol compositions without detrimentally affecting the insulation and other physical properties of the obtained rigid polyurethane foams.

It is a further object of the present invention to improve the solubility of hydrocarbon blowing agents in polyol compositions using low amounts of compatibilising agent.

These object are met by using in the process of making rigid polyurethane or urethane-modified polyisocyanurate foams from polyisocyanates and isocyanate-reactive components in the presence of hydrocarbon blowing agents a mixture of at least two polyoxyethylene polyether monols, said polyoxyethylene polyether monols differing in oxyethylene unit content.

By using polyoxyethylene polyether monols of the present invention the solubility of hydrocarbon blowing agents in polyols, primarily polyether polyols is improved. Higher loadings of hydrocarbon blowing agents can be used; therefore the water content can be lowered which leads to improved insulation performance. Because of this improvement in solubility the range of polyols and additives which can be used in hydrocarbon blown rigid polyurethane foams becomes broader. Once above the solubility level of the hydrocarbons the use of the present polyoxyethylene polyether monols leads to a stable emulsion of the hydrocarbon in the polyol composition; the emulsion is stable for more than 3 weeks.

Further by using a mixture of polyoxyethylene polyether monols differing in oxyethylene unit content instead of a single polyoxyethylene polyether monol lower amounts of said monols can be used. Also the stability of the polyol blend containing said mixture of polyoxyethylene polyether monols over a wide temperature range is improved.

The polyoxyethylene polyether monols for use in the present invention may be prepared by simple addition of ethylene oxides to an initiator fatty hydrocarbon having one alkylene oxide active hydrogen represented by the general formula R-X where R represents a branched or unbranched, saturated or ethylenically unsaturated, aliphatic or alicyclic radical, preferably an aliphatic linear saturated alkyl radical and X represents OH, NRH or SH, preferably OH. Preferably R contains 12 to 15 carbon atoms. In a preferred embodiment the monol is initiated with a fatty alcohol preferably containing 12 to 15 carbon atoms. The fatty alcohol is preferably a branched or unbranched $C_{12}$–$C_{15}$ aliphatic primary or secondary alcohol, most preferably a branched or unbranched $C_{12}$–$C_{15}$ alkyl primary alcohol. As used herein, the designation of a $C_{12}$–$C_{15}$ fatty alcohol or any such similar designation includes those instances where the initiator may be composed purely of molecules each having the same number of carbon atoms and the same structure, the same number of carbon atoms but structural isomers or stereoisomers of each other, or a mixture of compounds having different numbers of carbon atoms so long as at least 90 wt % of the molecules in the mixture have carbon chain lengths within the range described above. Mixtures of fatty alcohols having different numbers of carbon atoms are preferred. Preferred are mixtures of $C_{13}$–$C_{15}$ fatty alcohols and mixtures of $C_{12}$–$C_{14}$ fatty alcohols. It is preferred to use primary fatty alcohols which have a linear structure.

The monols used in the present invention are prepared by adding ethylene oxide onto the initiator molecule. The amount of ethylene oxide added is sufficient to make a monol having a hydroxyl value in the range 100 to 200 mg KOH/g, preferably in the range 120 to 180, more preferably 140 to 180 mg KOH/g. In general therefore the average total number of ethylene oxide added onto the initiator molecule is from 2 to 5.

The addition of ethylene oxide to made the monols is generally carried out in the presence of an alkaline catalyst. Examples include sodium hydroxide, potassium hydroxide, sodium ethylate, sodium methylate, potassium acetate, sodium acetate and trimethylamine. The reaction is usually carried out at elevated temperatures and pressures. The catalyst may be neutrialised with a carboxylic acid.

The polyoxyethylene polyether monols of the present invention generally have an HLB (Hydrophile-Lipophile Balance) number in the range 5 to 11, preferably 5 to 9. More information about the HLB system can be found in Kirk-Othmer Encyclopedia of Chemical Technology, 3rd Edition, Vol. 8 (1979), page 900, in Handbook of Surfactants, 2nd Edition, Blackie Academic & Professional, New York (1994) and in "The HLB System: A Time-Saving Guide to Emulsifier Selection", ICI Surfactants, Wilmington, Del. (1992).

Examples of suitable polyoxyethylene polyether monols for use in the present invention include the commercially available products Atpol 4743 ($C_{13}$–$C_{15}$ fatty alcohol onto which is added an average of 3 moles of ethylene oxide; OH value 160 mg KOH/g), Atpol 4768 ($C_{12}$–$C_{14}$ fatty alcohol onto which is added an average of 2 moles of ethylene oxide; OH value 180 mg KOH/g), Atpol 4868 ($C_{13}$–$C_{15}$ fatty alcohol onto which is added an average of 5 moles of ethylene oxide; OH value 120 mg KOH/g) and Atpol 4867 ($C_{13}$–$C_{15}$ fatty alcohol onto which is added an average of 4 moles of ethylene oxide; OH value 140 mg KOH/g), all available from Imperial Chemical Industries. Atpol 4743 and Atpol 4868 are particularly suitable for cyclopentane blown systems; Atpol 4768 is particularly suitable for n-pentane/isopentane blown systems.

Mixtures of two or more of the above polyoxyethylene polyether monols are used in the process of the present invention. Said polyoxyethylene polyether monols differ in the average number of oxyethylene units; preferably the difference in average number of oxyethylene units between the monols is at least 2.

By using such a mixture the solubility of hydrocarbon blowing agents is further improved such that lower amounts of polyoxyethylene polyether monols can be used. Amounts of 2 to 5 pbw (per 100 pbw of polyol composition) of polyoxyethylene polyether monols are usually enough when a mixture of monols is used whereas if only a single polyoxyethylene polyether monol is used the amounts needed to dissolve the same amount of hydrocarbon blowing agent are usually in the range of 5 to 10 pbw per 100 pbw of polyol composition.

Preferably a 70/30 wt mixture of Atpol 4768 and Atpol 4868 or a 70/30 wt mixture of Atpol 4768 and Atpol 4743 is used, especially for solubilising mixtures of cyclopentane and isopentane or n-pentane in polyol compositions for rigid polyurethane foams.

The total amount of monols used in the polyol composition is generally between 0.5 and 15 wt %, preferably between 1 and 10 wt %, more preferably between 2 and 5 wt % and most preferably between 2 and 3 wt %.

Suitable isocyanate-reactive compounds to be used in the process of the present invention include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

The present polyethylene polyether monols are especially suitable for use in isocyanate-reactive compositions containing polyether polyols. Up to 20 wt % of polyester polyols can be present. Above that level of polyester polyols no improvement in solubility of hydrocarbon blowing agents in the polyol blend is observed with the present monol.

Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanathobenzene. Other organic polyisocyanates which may be mentioned include the aliphatic diisocyanates such as isophorone diisocyanate, 1,6-diisocyanatohexane and 4,4'-diisocyanatodicyclohexylmethane.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

Suitable hydrocarbon blowing agents include lower aliphatic or cyclic, linear or branched hydrocarbons such as alkanes, alkenes and cycloalkanes, preferably having from 4 to 8 carbon atoms. Specific examples include n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene and any mixture of the above. Preferred hydrocarbons are n-butane, iso-butane, cyclopentane, n-pentane and isopentane and any mixture thereof, in particular mixtures of n-pentane and isopentane (preferred weight ratio 3:8), mixtures of cyclopentane and isobutane (preferred weight ratio 8:3), mixtures of cyclopentane and n-butane and mixtures of cyclopentane and iso- or n-pentane (preferred weight ratio between 6:4 and 8:2).

Other physical blowing agents known for the production of rigid polyurethane foam can be used together with the hydrocarbon blowing agents. Examples of these include dialkyl ethers, cycloalkylene ethers and ketones, fluorinated ethers, chlorofluorocarbons, perfluorinated hydrocarbons, and in particular hydrochlorofluorocarbons and hydrofluorocarbons. Examples of suitable hydrochlorofluorocarbons include 1-chloro-1,2-difluoroethane, 1-chloro-2,2-difluoroethane, 1-chloro-1,1-difluoroethane, 1,1-dichloro-1-fluoroethane and monochlorodifluoromethane. Examples of suitable hydrofluorocarbons include 1,1,1,2-tetrafluoroethane, 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane and 1,1,1,3,3-pentafluoro-n-butane.

Generally water or other carbon dioxide-evolving compounds are used together with the physical blowing agents. Where water is used as chemical co-blown agent typical amounts are in the range from 0.2 to 5%, preferably from 0.5 to 3% by weight based on the isocyanate-reactive compound.

The total quantity of blowing agent to be used in a reaction system for producing cellular polymeric materials will be readily determined by those skilled in the art, but will typically be from 2 to 25% by weight based on the total reaction system.

In addition to the polyisocyanate and polyfunctional isocyanate-reactive compositions and the blowing agents, the foam-forming reaction mixture will commonly contain one or more other auxiliaries or additives conventional to formulations for the production of rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimenthylcyclohexylamine or triethylene diamine, isocyanurate catalysts, fire retardants, for example halogenated alkyl phosphates such as tris chloropropyl phosphate, and fillers such as carbon black.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

It is convenient in many applications to provide the components for polyurethane production in pre-blended formulations based on each of the primary polyisocyanate and isocyanate-reactive components. In particular, many reaction systems employ a polyisocyanate-reactive composition which contains the major additives such as the blowing agent and the catalyst in addition to the polyisocyanate-reactive component or components.

Therefore the present invention also provides a polyisocyanate-reactive composition comprising the present mixture of polyethylene polyether monols.

The various aspects of this invention are illustrated, but not limited by the following examples.

The following reaction components are referred to in the examples:

Atpol 4743: A polyethylene polyether monol initiated with $C_{13}$–$C_{15}$ fatty alcohol onto which is added an average of 3 moles of ethylene oxide; OH value 160 mg KOH/g, available from Imperial Chemical Industries.

Atpol 4768: A polyethylene polyether monol initiated with $C_{12}$–$C_{14}$ fatty alcohol onto which is added an average of 2 moles of ethylene oxide; OH value 180 mg KOH/g, available from Imperial Chemical Industries.

Atpol 4868: A polyethylene polyether monol initiated with $C_{13}$–$C_{15}$ fatty alcohol onto which is added an average of 5 moles of ethylene oxide; OH value 120 mg KOH/g, available from Imperial Chemical Industries.

Atpol 4867: A polyethylene polyether monol initiated with $C_{13}$–$C_{15}$ fatty alcohol onto which is added an average of 4 moles of ethylene oxide; OH value 140 mg KOH/g, available from Imperial Chemical Industries.

Mix 1: A 70/30 weight mixture of Atpol 4768 and Atpol 4868

Synperonic L7: A polyethylene polyether monol initiated with $C_{12}$–$C_{14}$ fatty alcohol onto which is added an average of 7 moles of ethylene oxide; OH value 100 mg KOH/g, available from Imperial Chemical Industries.

Additive: $C_{12}H_{25}$—$(OCH_2CH_2)_4$—$OH$

Polyol 1: A sugar based polyether polyol of OH value 460 mg KOH/g.

Polyol 2: A sugar based polyether polyol of OH value 555 mg KOH/g.

Polyol 3: A sugar based polyether polyol of OH value 495 mg KOH/g.

Polyol 4: An aromatic amine initiated polyether polyol of OH value 500.

Polyol 5: An aromatic amine initiated polyether polyol of OH value 300.

Polyol 6: An aromatic amine initiated polyether polyol of OH value 300.

Polyol 7: An aromatic amine initiated polyether polyol of OH value 353.

Polyol 8: A sugar initiated polyether polyol of OH value 575.

Polyol 9: A sugar initiated polyether polyol of OH value 380.

Polyol 10: A glycerine initiated polyether polyol of OH value 540.

Polyol 11: An aliphatic polyester polyol of OH value 280.

Isocyanate: A polymeric MDI.

Surfactant: A silicone surfactant.

Catalyst: An amine catalyst.

Retardant: A phosphorus containing fire retardant.

EXAMPLE 1

Solubility of isopentane in different polyether polyols was determined in the absence of monol and in the presence of monol. The figure quoted is the upper concentration (in parts by weight) of isopentane that can be added and still obtain a clear blend.

Results are presented in Table 1. These results show that the solubility of isopentane in polyether polyols is substantially improved by using monols according to the present invention.

TABLE 1

|  | No monol | +10 pbw Atpol 4743 | +10 pbw Atpol 4768 |
|---|---|---|---|
| Polyol 1 | 6 | 14 | 15 |
| Polyol 2 | 5 | 12 | 14 |
| Polyol 3 | 4 | 9 | 11 |

EXAMPLE 2

Polyol blends were made containing the ingredients (amounts in parts by weight) as listed below in Table 2.

Solubility of isopentane in these different polyol blends was determined in the absence of monol and in the presence of monol. The figure quoted is the upper concentration (in parts by weight) of isopentane that can be added and still obtain a clear blend.

Results are presented in Table 3. These results show that the solubility of isopentane in polyol blends is substantially improved by using monols according to the present invention.

TABLE 2

|  | Blend 1 | Blend 2 | Blend 3 | Blend 4 | Blend 5 |
|---|---|---|---|---|---|
| Polyol 1 | 31 | 33 | 34.7 |  |  |
| Polyol 2 |  |  | 19.7 |  |  |
| Polyol 4 | 33 |  | 18.0 |  |  |
| Polyol 5 | 30 |  |  |  |  |
| Polyol 6 |  | 25 | 19.5 |  |  |
| Polyol 7 |  | 35 |  |  |  |
| Polyol 8 |  |  |  | 48 | 48 |
| Polyol 9 |  |  |  | 27 | 27 |
| Polyol 10 |  |  |  | 8 | 8 |
| Catalyst | 1.5 | 2.7 | 3.7 | 1.7 | 1.7 |
| Surfactant | 2.3 | 2.0 | 2.2 | 2.1 | 2.1 |
| Retardant |  |  |  | 11 |  |
| Water | 2.2 | 2.0 | 2.2 | 2.2 | 2.2 |

TABLE 3

|  | No monol | +10 pbw Atpol 4743 | +10 pbw Atpol 4768 |
|---|---|---|---|
| Blend 1 | 7 | 14 | 15 |
| Blend 2 | 9 | 14 | 16 |
| Blend 3 | 4 | 7 | 9 |
| Blend 4 | 8 | 14 | 16 |
| Blend 5 | 4 | 10 | 12 |

EXAMPLE 3

Solubility of cyclopentane in different polyol blends was determined in the absence of monol and in the presence of monol. The figure quoted is the upper concentration (in parts by weight) of cyclopentane that can be added and still obtain a clear blend.

Results are presented in Table 4. These results show that the solubility of cyclopentane in polyol blends is substantially improved by using monols according to the present invention.

TABLE 4

|  | No monol | +10 pbw Atpol 4743 | +10 pbw Atpol 4768 |
|---|---|---|---|
| Blend 1 | 12 | 20 | 20 |
| Blend 2 | 9 | 18 | 16 |
| Blend 3 | 4 | 12 | 12 |

EXAMPLE 4

Solubility of isopentane in polyol blend 4 (as defined in example 2) to which are added certain amounts of Polyol 11 was determined in the absence of monol and in the presence of monol. The figure quoted is the upper concentration (in parts by weight) of isopentane that can be added and still obtain a clear blend.

Results are presented in Table 5. These results show that the solubility of isopentane in polyol blends containing up to 20 wt % of polyester polyol is also improved by using monols according to the present invention.

TABLE 5

|  | No monol | +10 pbw Atpol 4743 |
|---|---|---|
| 100% Blend 4 | 8 | 14 |
| 90% Blend 4 + 10% Polyol 11 | 5 | 11 |
| 80% Blend 4 + 20% Polyol 11 | 3 | 8 |

EXAMPLE 5

Solubility of isopentane in polyol blend 5 (as defined in example 2) to which are added certain amounts of Polyol 11 was determined in the absence of monol and in the presence of monol. The figure quoted is the upper concentration (in parts by weight) of isopentane that can be added and still obtain a clear blend.

Results are presented in Table 6. These results show that the solubility of isopentane in polyol blends containing up to 20 wt % of polyester polyol is also improved by using monols according to the present invention.

TABLE 6

|  | No monol | +10 pbw Atpol 4743 |
|---|---|---|
| 100% Blend 5 | 4 | 10 |
| 90% Blend 5 + 10% Polyol 11 | 3 | 8 |
| 80% Blend 5 + 20% Polyol 11 | 2 | 5 |

EXAMPLE 6

The polyethylene polyether monol of the present invention (Atpol 4743) was added to a polyol blend containing solely polyester polyols (Polyol 11) and no polyether polyols. The solubility of isopentane in the polyester polyol blend in the absence of Atpol 4743 was below 2 pbw and did not improve upon the addition of 10 pbw of Atpol 4743 to the polyester blend. Instead phase separation took place immediately; the monol of the present invention is not compatible with polyester polyols.

EXAMPLE 7

Rigid polyurethane foams were made from the ingredients listed below in Table 7.

Foams properties were measured: free rise density (according to standard DIN 53420), thermal conductivity (Lambda) at 10° C. (according to standard ISO 2581) and compression strength (10% overpack density at 34 kg/m³) (according to standard DIN 53421).

The results are given in Table 7.

These results show that the foam properties are not detrimentally affected by using the monols of the present invention.

TABLE 7

| Foam No. | | 1 | 2 |
|---|---|---|---|
| Blend 1 | pbw | 100 | 100 |
| Cyclopentane | pbw | 13 | 13 |
| Atpol 4743 | pbw | 0 | 5 |
| Isocyanate | pbw | 150 | 150 |
| Density | kg/m³ | 23.7 | 23.4 |
| Lambda | mW/mK | 20.8 | 20.4 |
| Compression strength | kPa | 151 | 161 |

EXAMPLE 8

Solubility of isopentane in polyol blend 1 (as defined in example 2) was determined in the absence of monol and in the presence of certain monols. The figure quoted is the upper concentration (in parts by weight) of isopentane that can be added and still obtain a clear blend.

Results are presented in Table 8. These results show that the solubility of isopentane in polyol blends containing polyoxyethylene polyether monols of the present invention (Atpol 4743) is improved more than if polyoxyethylene polyether monols of the prior art are used (Synperonic L7).

TABLE 8

| | Isopentane solubility | Increase in isopentane solubility |
|---|---|---|
| 100% Blend 1 | 7 | 0% |
| 100% Blend 1 + 10% Atpol 4743 | 14 | 100% |
| 100% Blend 1 + 10% Synperonic L7 | 10 | 43% |
| 100% Blend 1 + 5% Atpol 4743 | 12 | 71% |
| 100% Blend 1 + 5% Synperonic L7 | 8–9 | 21% |

EXAMPLE 9

Polyol blends were made containing the ingredients (amounts in parts by weight) as listed below in Table 9.

Solubility of cyclopentane in these different polyol blends was determined in the absence of monol and in the presence of a single monol and in the presence of a mixture of monols.

The storage stability of the obtained blends is reported in Tables 10, 11 and 12. The storage stability is determined in accordance with the following procedure. The hydrocarbon is blended into the polyol mixture and the resulting blend is allowed to stand at room temperature for 7 days. After this period, the stability of the resulting blend is visually rated according to the following scheme: "separates" means the blend separates into multiple layers; "trubid" means the blend does not separate into multiple layers but does not become clear on agitation; "clear" means the blend is clear and not separated into multiple layers.

These results show that by suing a mixture of polyoxyethylene polyether monols according to the present invention stable blends are obtained compared to using a single polyoxyethylene polyether monol. Further these stable blends are obtained using lower amounts of the polyoxyethylene polyether monol mixtures compared to using only a single monol.

TABLE 9

| | Blend 6 | Blend 7 | Blend 8 |
|---|---|---|---|
| Polyol 1 | | 34.7 | 36.0 |
| Polyol 2 | | 19.7 | |
| Polyol 4 | 35.0 | 18.0 | 20.0 |
| Polyol 6 | 20.0 | 19.5 | 38.0 |
| Polyol 8 | 38.1 | | |
| Catalyst | 2.9 | 2.9 | 2.9 |
| Surfactant | 2.3 | 2.3 | 2.3 |
| Water | 2.0 | 2.0 | 2.0 |

TABLE 10

| Blend 6 | 100 | 90 | 95 | 90 | 95 |
|---|---|---|---|---|---|
| cyclopentane | 20 | 20 | 20 | 20 | 20 |
| Additive | 0 | 10 | 5 | 0 | 0 |
| Mix 1 | 0 | 0 | 0 | 10 | 5 |
| Stability after 7 days at room temperature | separates | clear | separates | clear | separates |
| Stability after after 7 days at 0° C. | separates | separates | separates | clear | separates |

TABLE 11

| Blend 7 | 100 | 90 | 95 | 90 | 95 |
|---|---|---|---|---|---|
| cyclopentane | 20 | 20 | 20 | 20 | 20 |
| Additive | 0 | 10 | 5 | 0 | 0 |
| Mix 1 | 0 | 0 | 0 | 10 | 5 |
| Stability after 7 days at room temperature | separates | clear | separates | clear | turbid |
| Stability after 7 days at 0° C. | separates | turbid | separates | clear | separates |

TABLE 12

| Blend 8 | 100 | 90 | 95 | 97 | 90 | 95 | 97 | 98 |
|---|---|---|---|---|---|---|---|---|
| cyclopentane | 20 | 20 | 20 | 20 | 20 | 20 | 20 | 20 |
| Additive | 0 | 10 | 5 | 3 | 0 | 0 | 0 | 0 |
| Mix 1 | G | 0 | 0 | 0 | 10 | 5 | 3 | 2 |
| Stability after 7 days at room temperature | separates | clear | clear | separates | clear | clear | clear | clear |
| Stability after 7 days at 0° C. | separates | clear | turbid | separates | clear | clear | clear | turbid |

EXAMPLE 10

Polyol blends were made containing the ingredients (amounts in parts by weight) as listed below in Table 13.

Solubility of a 40/60 mixture of isopentane and cyclopentane in these different polyol blends was determined in the absence of monol and in the presence of different monols. The figure quoted is the upper concentration (in parts by weight) of isopentane/cyclopentane mixture that can be added and still obtain a clear blend.

Results are presented in Table 14. These results show that whereas 7 pbw of a single monol are needed to dissolve 13 pbw of iso/cyclopentane in the polyol blend only 5 pbw of a mixture of monols is needed to dissolve the same amount.

TABLE 13

|  | Blend 9 | Blend 10 | Blend 11 |
|---|---|---|---|
| Polyol 1 | 31 | 36 |  |
| Polyol 2 |  |  |  |
| Polyol 4 | 33 | 20 | 20 |
| Polyol 6 | 30 | 37.2 | 37.3 |
| Polyol 8 |  |  | 36 |
| Catalyst | 1.5 | 2.6 | 2.6 |
| Surfactant | 2.3 | 2.3 | 2.3 |
| Water | 2.2 | 1.9 | 1.8 |

TABLE 14

|  | Atpol 4868 | Atpol 4867 | Atpol 4743 | Atpol 4768 | iso/cyclopentane |
|---|---|---|---|---|---|
| Blend 9 | 5 |  |  |  | 12 |
| Blend 9 |  | 5 |  |  | 12 |
| Blend 9 |  |  | 5 |  | 12–13 |
| Blend 9 |  |  |  | 5 | 12 |
| Blend 9 | 7 |  |  |  | 13 |
| Blend 9 |  | 7 |  |  | 13 |
| Blend 9 |  |  | 7 |  | 14 |
| Blend 9 |  |  |  | 7 | 13 |
| Blend 9 |  |  | 1.5 | 3.5 | 13 |
| Blend 9 | 1.5 |  |  | 3.5 | 13 |
| Blend 10 |  |  | 1.5 | 3.5 | 17 |
| Blend 10 | 1.5 |  |  | 3.5 | 17 |
| Blend 10 |  |  | 0.6 | 1.4 | 14 |
| Blend 10 | 0.6 |  |  | 1.4 | 14 |
| Blend 11 |  |  | 1.5 | 3.5 | 15/16 |
| Blend 11 | 1.5 |  |  | 3.5 | 15/16 |
| Blend 11 |  |  | 0.6 | 1.4 | 14 |
| Blend 11 | 0.6 |  |  | 1.4 | 14 |

We claim:

1. Process for preparing rigid polyurethane or urethane-modified polyisocyanurate foams comprising the step of reacting an organic polyisocyanate with a polyfunctional isocyanate-reactive component containing polyether polyols and optionally up to 20 wt % of polyester polyols, in the presence of a hydrocarbon blowing agent and at least two polyoxyethylene polyether monols having a hydroxyl value of between 100 and 200 mg KOH/g, said polyoxyethylene polyether monols differing in oxyethylene unit content.

2. Process according to claim 1 wherein said polyoxyethylene polyether monols are initiated with a $C_{12}$–$C_{15}$ fatty hydrocarbon having one alkylene oxide active hydrogen atom.

3. Process according to claim 2 wherein said $C_{12}$–$C_{15}$ fatty hydrocarbon is a $C_{12}$–$C_{15}$ fatty alcohol.

4. Process according to claim 1 wherein the hydroxyl value of the monols is between 120 and 180 mg KOH/g.

5. Process according to claim 1 wherein the average total number of ethylene oxide units in the monols is between 2 and 5.

6. Process according to claim 1 wherein the average oxyethylene unit content of both polyoxyethylene polyether monols differs with at least 2 units.

7. Process according to claim 1 wherein the total amount of the monols is between 0.5 and 15% by weight based on the isocyanate-reactive composition.

8. Process according to claim 7 wherein the total amount of the monols is between 1 and 5% by weight based on the isocyanate-reactive composition.

9. Process according to claim 8 wherein the total amount of the monols is between 2 and 3% by weight based on the isocyanate-reactive composition.

10. Process according to claim 1 wherein the hydrocarbon blowing agent is n-butane, isobutane, cyclopentane, n-pentane, isopentane or any mixture thereof.

11. Process according to claim 10 wherein the hydrocarbon blowing agent is a mixture of cyclopentane and iso- or n-pentane in a weight ratio of 6/4 to 8/2 and wherein a mixture of 70/30 (wt ratio) Atpol 4768 and Atpol 4868 or a mixture of 70/30 (wt ratio) Atpol 4768 and Atpol 4743 is used as monols.

12. Polyfunctional isocyanate-reactive composition comprising polyether polyols and optionally up to 20 wt % of polyester polyols, a hydrocarbon blowing agent and at least two polyoxyethylene polyether monols having a hydroxyl value of between 100 and 200 mg KOH/g, said polyoxyethylene polyether monols differing in oxyethylene unit content.

13. Polyfunctional isocyanate-reactive composition comprising a hydrocarbon blowing agent and at least two polyoxyethylene polyether monols, said polyoxyethylene polyether monols differing in oxyethylene unit content wherein said monols are as defined in claim 2.

14. Composition according to claim 12 wherein the amount of said monols is between 0.5 and 15% by weight.

15. Composition according to claim 12 wherein the average total number of ethylene oxide units in the monols is between 2 and 5.

16. Composition according to claim 12 wherein the total amount of the monols is between 1 and 5% by weight based on the isocyanate-reactive composition.

17. Composition according to claim 12 wherein the hydroxyl value of the monols is between 120 and 180 mg KOH/g.

* * * * *